United States Patent [19]

Jasinski

[11] Patent Number: 5,005,014
[45] Date of Patent: Apr. 2, 1991

[54] SYSTEM AND METHOD FOR OPTIMALLY TRANSMITTING ACKNOWLEDGE BACK RESPONSES

[75] Inventor: Leon Jasinski, Ft. Lauderdale, Fla.

[73] Assignee: Motorola, Inc., Schaumburg, Ill.

[21] Appl. No.: 354,568

[22] Filed: May 22, 1989

[51] Int. Cl.$^5$ ............................................... G08B 5/22
[52] U.S. Cl. ............................ 340/825.44; 340/825.54; 370/85.4; 379/59
[58] Field of Search .................. 340/825.05, 825.08, 340/825.22, 825.44–825.48, 825.54; 370/85.4, 85.5, 85.6, 85.8; 379/58, 59; 455/38, 73, 88, 89, 54, 134

[56] References Cited

U.S. PATENT DOCUMENTS

| | | | |
|---|---|---|---|
| 3,652,993 | 3/1972 | Bridwell et al. | 340/825.22 |
| 4,477,809 | 10/1984 | Bose | 455/54 X |
| 4,683,531 | 7/1987 | Kelch et al. | 340/825.08 X |
| 4,736,367 | 4/1988 | Wroblewski et al. | 340/825.08 X |
| 4,882,579 | 11/1989 | Siwiak | 340/825.44 |
| 4,882,730 | 11/1989 | Shinmyo | 340/825.08 X |

*Primary Examiner*—Ulysses Weldon
*Attorney, Agent, or Firm*—Philip P. Macnak; Vincent B. Ingrassia; William E. Koch

[57] ABSTRACT

A method for providing system acknowledge back responses from a plurality of remote stations to a central station is provided. The system acknowledge back responses include a predetermined station identification number assigned to each remote station and any individual acknowledge back responses received by each remote station from a plurality of portable communication receivers. The station identification number assigned to each remote station begins with a first station number and ends with a last station number in a predetermined sequential order. The method provides a start signal being first generated by the central station to initiate the transmission of the system acknowledge back responses from each of the plurality of remote stations. The transmissions begin from the first station in response to the first station receiving the start signal, and from each subsequent remote station in the predetermined sequential order in response to each subsequent station in the predetermined sequential order receiving the predetermined station identification number of the previous remote station. The central station, or a previous remote station may repeat the station identification number of the previous station when a subsequent station fails to respond, thereby insuring a reliable transmission of acknowledge back responses from the remote stations to the central station.

15 Claims, 5 Drawing Sheets

SYSTEM AND METHOD FOR OPTIMALLY TRANSMITTING ACKNOWLEDGE BACK RESPONSES

BACKGROUND OF THE INVENTION

1. Field of the Invention

This invention generally relates to the field of communications systems providing acknowledge back response capability for portable communication receivers, and more specifically to a system and method for optimally transmitting the acknowledge back responses received from the portable communication receiver at a remote receiving stations to a central receiving station.

2. Description of the Prior Art

Communication systems providing acknowledge back response capability have been available for a number of years. One such system enables a portable communication receiver having acknowledge back capability, to immediately communicate back a response, after the receiver has been initially contacted. The response provided may be a voice, numeric or alphanumeric message informing the originator of the communication that the message was successfully received by the portable receiving unit, and may further provide a response to the received message. Such acknowledge back systems have generally been only suitable for use in small, on-site systems, having a single central transmitter, and one or more wire-line connected acknowledge back system receivers for receiving the acknowledge back responses. The number of acknowledge back system receivers provided was a function of the acknowledge back transmitter power output provided with the portable communication receiver. Such transmitter power outputs were generally low, much less than one watt, due to the requirement for portability of the communication receiver, and the necessity to minimize the size of the battery subsequently required.

For large, wide area systems, the infrastructure required for providing acknowledge back response capability becomes considerably more complex. Wide area systems require messages intended for the portable communication receivers to be inputted through a terminal, such as a paging terminal, located at a central location. The messages are then distributed via wire-line or via link transmitters and receivers to each of a number of remote system transmitters or remote stations. The messages are then transmitted from the central station and from all remote system transmitters in a simulcast manner. In such systems, the number of communication receivers which can be in operation is high, ranging from one to ten thousand units and more, and the requirement for message throughput to support such a large number of communication receivers is equally high. The provision of acknowledge back capability in such a system places a tremendous strain on the ability of the system to maintain the message throughput. The problem may be further complicated by an increase in the number of system receivers which are required to support the communication receiver acknowledge back responses, and the problem of providing an efficient distribution of these responses from each of the remote stations back to the central station so that the response may be delivered to the message originators. An acknowledge back system for handling acknowledge back responses in an wide area communication system is required which does not compromise message throughput. The acknowledge back system must also insure reliable transmission of the communication acknowledge back responses received at the remote stations back to the central station for ultimate distribution back to the message originators.

SUMMARY OF THE INVENTION

It is an object of the present invention to provide a system for efficiently transmitting acknowledge back responses received from a plurality of portable communication receivers at a plurality of remote stations back to a central station for ultimate distribution back to the message originators.

It is a further object of the present invention to provide a system for reliably transmitting acknowledge back responses received from a plurality of portable communication receivers at a plurality of remote stations back to the central station.

A method is described for providing system acknowledge back responses from a plurality of remote stations to a central station. The system acknowledge back responses include a predetermined station identification number assigned to each remote station and any individual acknowledge back responses received by each remote station from a plurality of portable communication receivers. The station identification number assigned to each remote station begins with a first station number and ends with a last station number in a predetermined sequential order. The method provides a start signal being first generated by the central station to initiate the transmission of the system acknowledge back responses from each of the plurality of remote stations. The transmissions begin from the first station in response to the first station receiving the start signal, and from each subsequent remote station in the predetermined sequential order in response to each subsequent station in the predetermined sequential order receiving the predetermined station identification number of the previous remote station.

BRIEF DESCRIPTION OF THE DRAWINGS

The features of the invention which are believed to be novel are set forth with particularity in the appended claims. The invention itself, together with its further objects and advantages thereof, may be best understood by reference to the following description when taken in conjunction with the accompanying drawings, in the several figures of which like reference numerals identify identical elements, in which:

DESCRIPTION OF THE PREFERRED EMBODIMENTS

Figure 1:
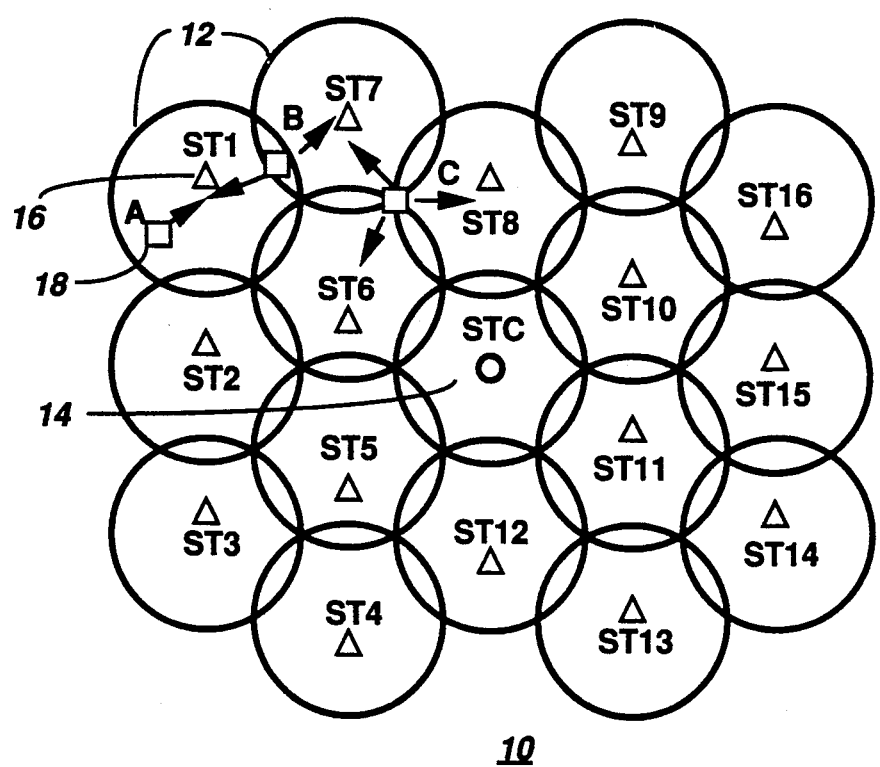
FIG. 1 is a line drawing of a typical area wide communication system employing acknowledge back responses from remote stations to a central station in the preferred embodiment of the present invention.

Referring to the drawings, and in particular to FIG. 1 which shows a wide area communication system 10 employing acknowledge back responses from a plurality of remote stations to a central station. The acknowledge back responses provided from the remote stations to the central station are hereinafter referred to as system acknowledge back responses, As shown in FIG. 1, a typical wide area communication system 10 is configured with a plurality of cells 12, a central transmitter station, or central station 14 (STC) and a plurality of remote transmitter stations, or remote stations 16 (ST1 to ST16). The transmitter within each cell is more or less centrally located for providing message transmission to a plurality of portable communication receivers 18 (A, B and C). It will be appreciated that FIG. 1 is for example only, and that the number and arrangement of the cells within system 10 is determined by the size of the geographic area to be covered, and the signal strength requirements to provide adequate message reception for the portable communication receivers 18 operating in the system 10. It will be further appreciated that the particular cell size geometry is primarily determined by the portable communication receiver antenna sensitivity, and that system acknowledge back response transmissions originating in one cell may be readily monitored by a link, or system receiver, in any adjacent cells, and may also be readily be monitored by the central station. The ability to monitor transmissions from cell to cell and from remote station cells to the central station is key to the operation of the present invention, as will become more apparent in the description to follow.

When messages are inputted into communication system 10, they are inputted through a terminal, such as a paging terminal which is well known in the art, which is located at central station 14. It will also be appreciated, the location of central station 14 with respect to the remote stations 16 is by way of example only and is determined by the geographic area being covered, and may only more or less be centrally located as shown. When the messages have been inputted to the terminal of central station 14, the messages are then distributed to the remote stations, using such methods as a hard wire line, such as a phone line, or a system of link transmitters and receivers between the central station 14 and the remote stations 16. Once the messages have been distributed to the remote stations 16, the messages are simulcast transmitted in a manner well known in the art from the central station 14 and remote stations 16 for communication to the portable communication receivers 18 operating in the system. When the messages have been received by the portable communication receivers 18 for which the messages were intended, those portable communication receivers 18 having acknowledge back capability will acknowledge reception of the messages. A method of providing acknowledge back responses from a plurality of communication receivers having acknowledge back capability is described in U.S. Pat. Application No. 07/141,654 to Siwiak et al. entitled "Frequency Division Multiplexed Acknowledge Back Paging System" which is assigned to the assignee of the present invention now U.S. Pat. No. 4,875,038. As shown in FIG. 1, three portable communication receivers A, B and C are shown, by way of example, operating in system 10, which upon receiving the intended messages acknowledge back a response to the message. The acknowledge back responses are received by acknowledge back receivers located within the central and each of the remote cells 12. In particular, as shown, the acknowledge back response of receiver A may only be received by remote station ST1, due to the limited acknowledge back transmitter power output. The acknowledge back response of receiver B may be received by remote stations ST1 and ST7 due to receiver B's location. The acknowledge back response of receiver C may be received by remote stations ST6, ST7 and ST8 also due to receiver C's location. Once the acknowledge back responses of the communication receivers has been received at the remote stations, they are then transmitted back to the central station, in a manner as shown in FIG. 2, for ultimate delivery of the responses back to the originators of the messages.

Figure 2:
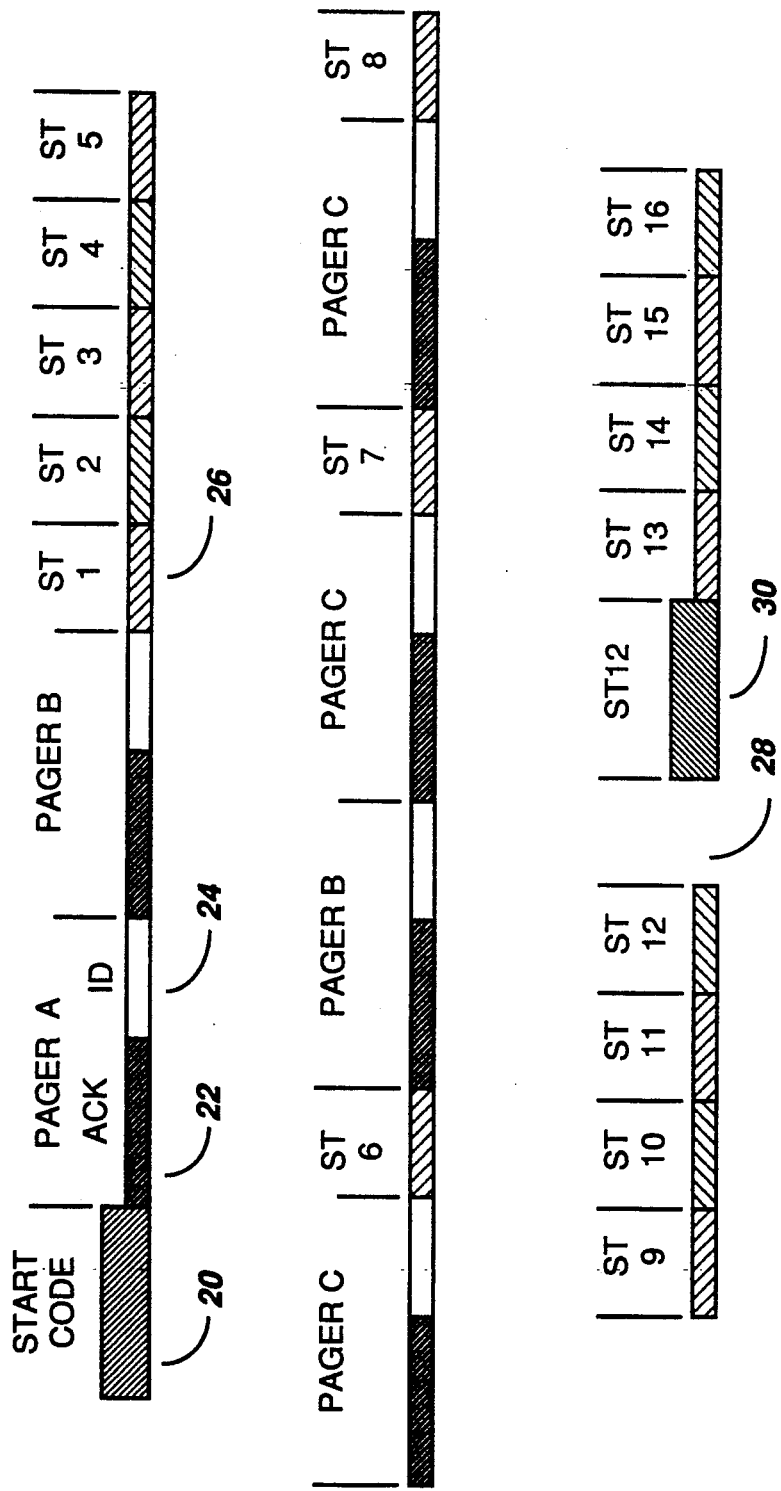
FIG. 2 is a timing diagram illustrating the transmission of acknowledge back responses from the remote stations to the central station in the preferred embodiment of the preset invention.

FIG. 2 shows a timing diagram illustrating the transmission of the system acknowledge back responses from the remote stations 16 to the central station 14 in the preferred embodiment of the present invention. The system acknowledge back responses may be initiated in any of a number of ways. As shown in FIG. 2, one method of initiating the system acknowledge back responses is by having the central station generate and transmit a start code 20 which is received at all remote stations, thereby indicating the system acknowledge back response sequenced has been initiated. The start code 20 may be a unique codeword, such as one providing an identification number for the central station. As shown in FIG. 2, the system acknowledge back responses from the remote stations occur sequentially in a predetermined order. Each remote station in the system is also assigned an identification number, or station ID which determines the predetermined order of response, beginning with the remote station designated as station 1. In the preferred embodiment of the present invention, the system acknowledge back responses include a message portion 22 and an associated pager ID portion 24 identifying the portable communication receiver from which the message portion was received. Since remote station ST1 received acknowledge back responses from receivers A and B, these responses are then relayed to the central station in the system acknowledge back response. Each transmission from a remote station is terminated by the station ID 26, in this instance ST1. Each of the remote stations monitors the system acknowledge back response traffic on the acknowledge back channel. Upon receiving the station ID 26 of remote station ST1, remote station ST2 begins its system acknowledge back response transmission. In this instance, since no receiver responses were received, remote station ST2 simply transmitted the station ID terminating its transmission. Each remote station in turn would transmit the system acknowledge back response until all stations have reported into the central station.

The order of the system acknowledge back responses is such that neighboring, or adjacent cells are assigned consecutive station ID numbers, as shown in FIG. 1. The progress of the system acknowledgment responses is monitored by each of the remote stations within the system that are in range, as well as by the central station. Should a remote station, such as remote station ST13, fail to respond in the predetermined order, as shown during a predetermined response time interval 28 of FIG. 2, the system acknowledge back response of the following remote stations is temporarily placed on hold, while the central station transmits a request to acknowledge 30 to the remote station which failed to respond. The request to acknowledge 30 is the station ID of the previous remote station to acknowledge in the preferred embodiment of the present invention. In the instance shown in FIG. 2, the previous responding remote station was remote station ST12. The central station transmits the station ID ST12, whereupon remote station ST13 may respond, allowing the completion of the system acknowledge back response sequence. It will be appreciated, that since the central and all remote stations are monitoring the system acknowledge back response transmissions, remote station ST12 could also have repeated the transmission of its station ID, as the request to acknowledge, after the predetermined time interval had elapsed.

The central station can also repeat the station ID of a nonresponsive remote station, when that station fails a second time to respond with the system acknowledge back response. In the preferred embodiment of the present invention, the process of requesting an acknowledgement is repeated three times, whereupon nonresponsiveness of the particular remote station is taken as an indication that remote station is non-operational. The system acknowledge back response for the nonresponsive station is then provided by the central station to allow any remaining remote stations to respond.

In summary, the system acknowledge back responses occur in a predetermined sequence. A control signal, or start code, as described, is used to initiate the system acknowledgment response sequence, and thereafter the response of each remote station in the system acknowledge back response sequence is initiated by the reception of the previous remote station ID in the sequence. The system acknowledge back response sequence may also be initiated at predetermined time intervals since each remote station is synchronized in time with the central station, or after a predetermined number of messages have been transmitted. By controlling the initiation of and monitoring of the system acknowledge back responses from the central station, interruptions in response from any remote station can be simply handled without disrupting the message delivery capabilities of the system. While only a limited number of coded acknowledge back responses have been described as being stored at any remote station, it will be appreciated the system described can operate to store a large number of coded acknowledge back responses at the remote stations before the system acknowledge back response cycle is initiated. Such operation would guarantee high message throughput in the operation of a wide area system.

Figure 3:
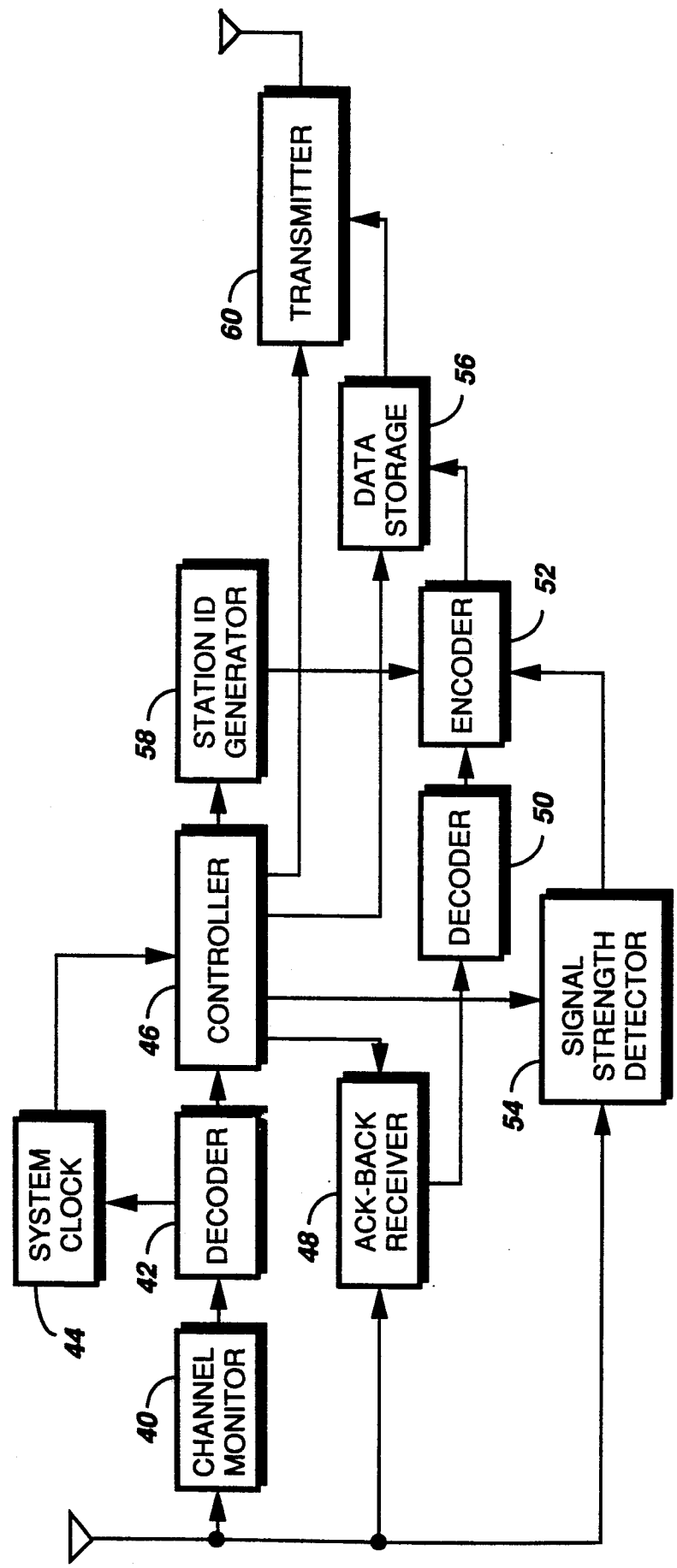
FIG. 3 is a block diagram of the apparatus employed in the preferred embodiment of the present invention for the central and remote stations.

FIG. 3 is a block diagram of the apparatus employed in the preferred embodiment of the present invention for the central and remote stations. As shown in FIG. 3, transmissions of the system acknowledge back responses is on a frequency, or channel, which is different from the frequency, or channel, on which transmissions from the remote stations to the portable communication receivers, occur. In operation, each remote station includes a channel monitor 40 which is a receiver for monitoring the transmission of system acknowledge back responses, and for receiving all transmissions originating from the central station to the remote station. Channel monitor 40, in the preferred embodiment of the present invention is a frequency modulated (FM) receiver for receiving frequency shift keyed (FSK) information in a manner which is well known in the art. The output of channel monitor 40 is a stream of digital information which couples to the input of decoder 42. Decoder 42 correlates the received binary data with predetermined codewords stored within decoder 42, generating outputs for controlling various remote station functions. One such output couples to system clock 44, providing information for synchronizing the system clock at each remote station with a master clock located at the central station in a manner well known in the art. System clock 42 couples to controller 46, providing the clock reference for timing all operations of the remote station. System clock 42 may also provide a real time clock function for controlling the operation of the central and each remote station at predetermined times throughout the operating day. The output of decoder 42 also couples to controller 46, providing outputs indicating such functions as the detection of the start code and remote station IDs, shown and described in FIG. 2.

Controller 46 is the heart of the central station and each remote station, controlling the operation. Controller 46 couples to back-back receiver 48, signal strength detector 54, data storage 56, station ID generator 58 and transmitter 60. Station controller 46 may be implemented using a microcomputer, such as an MC6809 microcomputer manufactured by Motorola, Inc. When a microcomputer is used to implement controller 46, the operation of the central station and each remote station is controlled by routines stored in memory either on chip, or in read only memory (ROM) circuits coupled to the microcomputer, in a manner well known to one of skill in the art.

Controller 46 couples to back-back receiver 48 for controlling such functions as battery saving, i.e. controlling the supply of power to ack-back receiver 48 in a manner well known in the art. Ack-back receiver 48, were enabled to receive information, operates on the acknowledge back frequency, or channel, on which each of the portable communication receiver operating in the system will respond. Ack-back receiver 48 is a frequency modulated (FM) receiver specially designed to receive a coded acknowledge back response from the portable communication receivers. In particular, ack-back receiver 48 includes a very narrow intermediate frequency (IF) bandwidth, providing the increased sensitivity required for receiving the low power transmission of the portable communication receivers. The output of ack-back receiver 48 is also a stream of binary information, corresponding to the acknowledge back responses transmitted from each portable communication receiver. Ack-back receiver 48 couples to decoder 50 which decodes the received pager acknowledge back responses and further provides error correction on the data decoded, thereby insuring the system acknowledge back response correspond as accurately as possible with the pager (coded) acknowledge back response. The output of decoder 50 couples to the input of encoder 52 which reencodes the information for transmission.

Controller 46 also controls such functions, as the power to signal strength detector 54. As the pager acknowledge back responses are being received, the signal strength of the received signal is also monitored, digitized and provided to encoder 52 in a manner well known in the art. The encoded signal strength information, together with the corresponding coded acknowledge back information is stored in data storage 56. After all coded acknowledge back responses have been received from the communication receivers, controller 46 disables the operation of back-back receiver 48 and signal strength detector 54, enabling station ID generator 58. In the preferred embodiment of the present invention, station ID generator 58 is a read only memory (ROM) storing a codeword corresponding to the assigned station ID for each remote station. Station ID generator 58 is provided at the central station to provide the start code information for the initiation of the system acknowledge back responses. The station ID codeword is also stored in data storage 56 identifying the end of the system acknowledge back response.

When the station ID corresponding to the activation code for the transmission of the system acknowledge back responses from each remote station is received by channel monitor 40 and decoded by decoder 42, controller 46 keys transmitter 60 and initiates the reading of the coded acknowledge back responses and signal strength information from data storage 56. Upon completion of the response transmission, transmitter 60 is de-keyed, so the the next remote station may respond in sequence.

Figure 4:
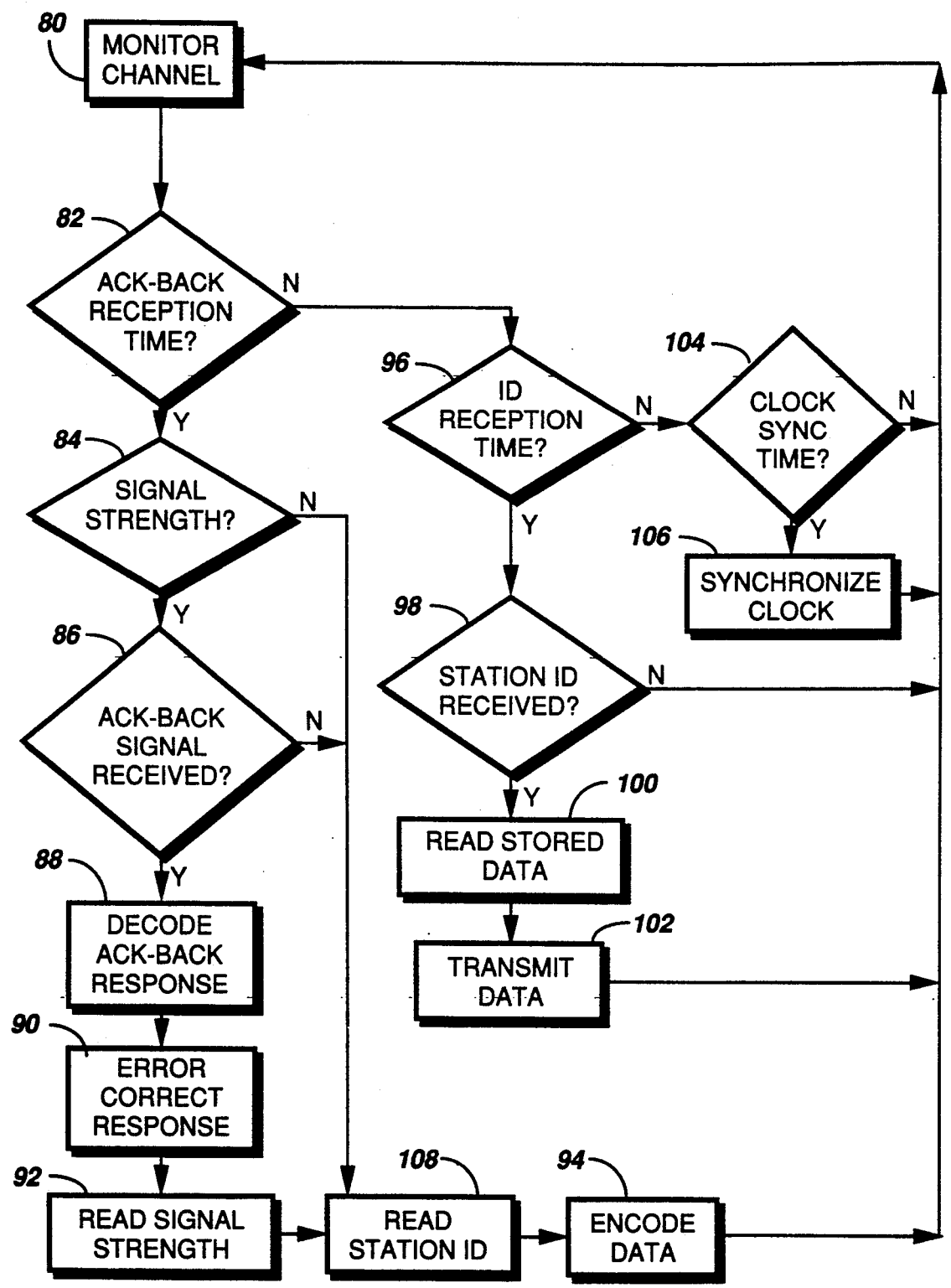
FIG. 4 is a flow chart illustrating the operation of the remote stations in transmitting acknowledge back responses to the central station in the preferred embodiment of the present invention.

FIG. 4 is a flow chart illustrating the operation of the remote stations in transmitting the system acknowledge back responses in the preferred embodiment of the present invention. When the remote stations are not actively transmitting messages to the portable communication receivers located within the remote station boundaries, the controller is monitoring the channel with the monitor receiver, at block 80 for transmissions from the central station, or for system acknowledge back responses from other remote stations. When it is time for receiving the pager acknowledge back responses from portable communication receivers located within the cell boundaries, at block 82, as determined either by having received a start code from the central station, or as determined by the system clock in each station, the controller activates the signal strength detector to determined when any pager acknowledge back responses are being transmitted, at block 82 and the back back receiver. When a signal is present, the decoder begins correlating for received pager acknowledge back responses, at block 84. As pager acknowledge back responses are received they are decoded, at block 88, and error corrected, at block 90. The signal strength corresponding to the error corrected pager acknowledge back response is determined from the signal strength detector, at block 92. The station ID is then recovered from the station ID generator, at block 108. The error corrected pager acknowledge back responses, corresponding signal strength measurements and station ID are then encoded, at block 94 for transmission at the appropriate time, previously described. After the pager acknowledge back data is encoded, at block 94, the remote station returns to monitor the channel, at block 80. The remote station may also return to the normal transmission cycle mode transmitting any received data from the central station to the portable communication receivers.

When no measurable signal is detected, at block 84, or no pager acknowledge back response data is received, at block 86, during the response time interval, only the station ID is read, at block 108, and encoded for transmission, at block 94, for subsequent transmission at the appropriate time. After the pager acknowledge back data is encoded, at block 94, the remote station returns to monitor the channel, at block 80 for transmissions from the central station, or for system acknowledgment response transmissions. The remote station may also return to the normal transmission cycle mode transmitting any received data from the central station to the portable communication receivers.

When it is not time for receiving pager acknowledge back responses, at block 82, each remote station is monitoring the channel for station ID, at block 96, or monitoring the channel to receive synchronization information, at block 104, and data transmitted from the central station. When it is time for the remote station to monitor the channel for station IDs, at block 96, each remote station monitors the channel for the transmission of the previously assigned station ID, at block 98, indicating the activation signal for transmitting the system acknowledge back response. When the previous station ID is received, at block 98, the system acknowledge back response information is read from the data storage, at block 100, and transmitted, at block 102. After the system acknowledge back is transmitted, at block 102, the remote station returns to monitor the channel, at block 80. The remote station may also return to the normal transmission cycle mode transmitting any received data from the central station to the portable communication receivers.

When it is time to receive the clock synchronization signals, at block 104, the system clock is enabled to respond to the received synchronization signals, at block 106. After clock synchronization is complete, the remote station returns to monitor the channel, at block 80. The remote station may also return to the normal transmission cycle mode transmitting any received data from the central station to the portable communication receivers.

Figure 5:
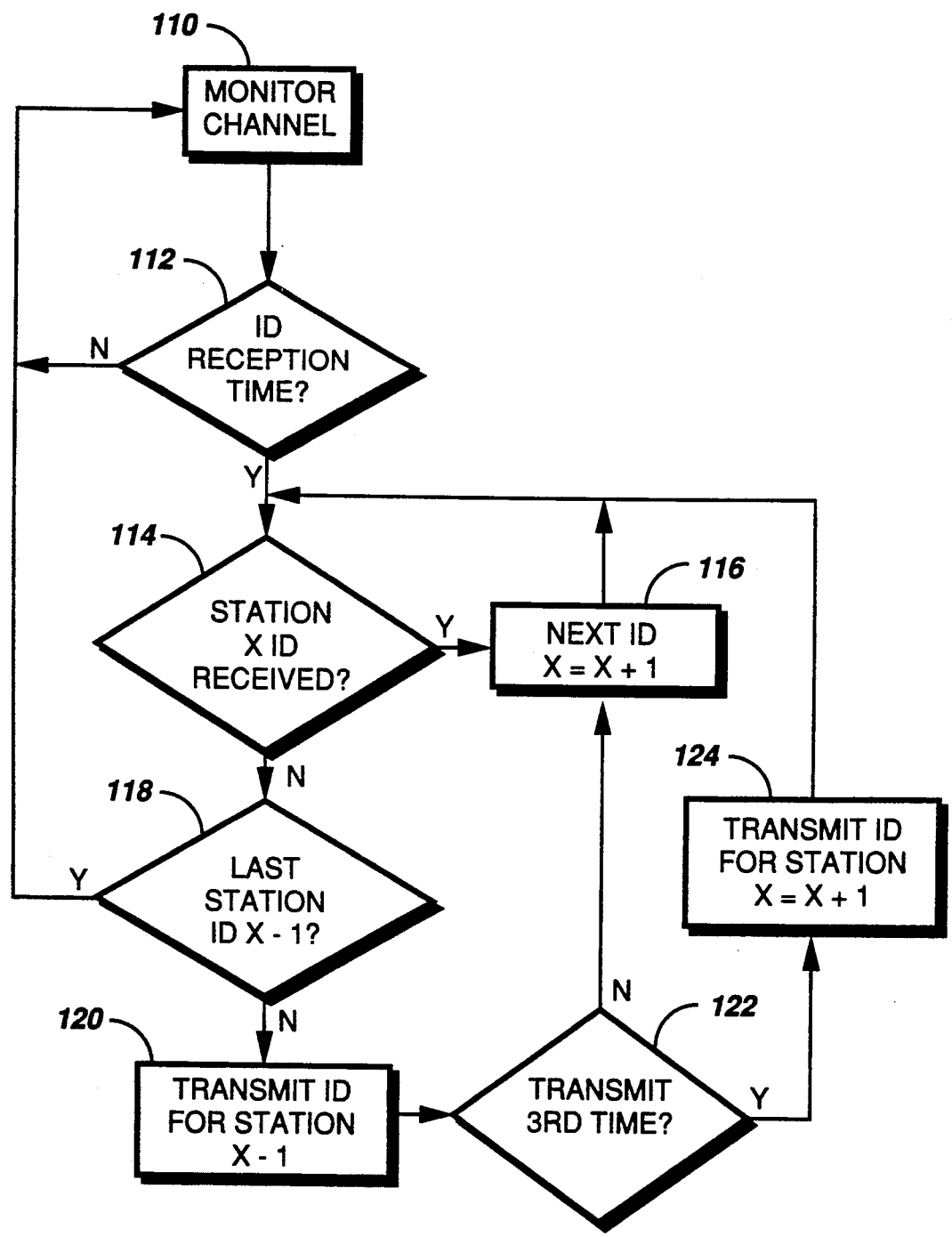
FIG. 5 is a flow chart illustrating the operation of the central station in receiving acknowledge back responses from the remote stations in the preferred embodiment of the present invention.

FIG. 5 is a flow chart illustrating the operation of the central station in receiving system acknowledge back responses from the remote stations in the preferred embodiment of the present invention. As previously described, the central station normally receives the system acknowledge back responses, thereafter communicating the responses back to the originator's of the messages. The central station also plays an active role in insuring system acknowledge back responses are received from each remote station. The central station monitors the system acknowledge back response channel when it is not actively transmitting information either to the remote stations, or to the portable communication receivers located within it cell boundaries, at block 110. When it is time to receive system acknowledge back responses from each of the remote stations, at block 112, the central station receives the system acknowledge back responses as it is transmitted, monitoring the sequence of the remote stations as they are responding, at block 114. As each remote station responds, the station ID of the next station to respond is computed, at block 116. Should a remote station fail to respond after a predetermined time interval, at block 114, the station ID of the last station to respond is determined, at block 118. The central station then transmits the station ID of the last station to respond representing the system acknowledge back response of that station, at block 120. The number of transmissions of the previous station ID is checked at block 122. If the number of transmissions is three or less, the station ID of the next station to respond is then computed, at block 116, and the central station returns to monitor for the response of the next remote station. Remote stations fail to respond primarily due to interference which may be received when the transmitter in the adjacent cell is transmitting the system acknowledge back response, resulting in the station ID to be missed. It will be appreciated, this problem has been minimized in the system of the present invention, by sequentially assigning remote station ID's such that the transmissions from remote cell to remote cell always originate in an adjacent cell. It will also be appreciated the number of requests for acknowledgement described is by way of example only, and more or less requests for acknowledgement may be provided to guarantee the level of reliability desired in the performance of receiving the system acknowledge back responses. When the number of transmissions of the previous station ID exceed three, at block 122, the ID of the station failing to respond is computed and transmitted from the central station, at block 124. The system acknowledge back responses from the other remote stations are continued to be monitored, until the last station is received, at block 118, whereupon the central station may return to monitor the channel, or transmit a new batch of messages to the remote stations to continue the process of message delivery.

While the central station was primarily responsible for monitoring the received system acknowledge back responses to insure that all remote station operating in the system responded, it will be appreciated the monitoring function may also be provided at the remote stations, as well. In this instance, when a remote station transmits the station ID of the next station in the predetermined sequential order, should that subsequent station fail to respond in the predetermined time interval, the previous station can also generate the request for acknowledgement, repeating the transmission of the previous station ID until the subsequent station transmits the system acknowledgement response, or until the subsequent remote station fails to respond after three requests for acknowledgement. When this happens, it will be appreciated that either the previous remote station or the central station may transmit the station ID of the subsequent remote station to continue the process of receiving acknowledge back responses from the remaining stations. However, in the preferred embodiment of the present invention, the transmission of the subsequent station ID is handled by the central station, as it provides the most reliable transmission to the next remote station in the predetermined sequential order.

While specific embodiments of this invention have been shown and described, further modifications and improvements will occur to those skilled in the art. All modifications which retain the basic underlying principles disclosed and claimed are within the scope and spirit of the present invention.

I claim:

1. A method for providing system acknowledge back responses from a plurality of remote stations to a central station, the system acknowledge back responses including a predetermined station identification number assigned to each remote station and any individual acknowledge back responses received by each remote station from a plurality of portable communication receivers operating in the system, the station identification numbers being assigned to each remote station beginning with a first remote station number and ending with a last remote station number in a predetermined sequential order, said method comprising the steps of:

generating a start signal and transmitting the same from the central station to initiate the transmission of system acknowledge back responses from the plurality of remote stations;

transmitting, from the first remote station, the system acknowledge back response in response to the first remote station receiving the start signal;

transmitting, from each subsequent remote station in the predetermined sequential order, the system acknowledge back response in response to the subsequent remote station receiving the predetermined station identification number of the previous remote station;

monitoring the progression of transmitted system acknowledge back responses at a selected station from the remote station in the predetermined sequential order; and generating and transmitting from the selected station, a request to acknowledge which includes the predetermined station identification number of the previous remote station in response to subsequent remote station failing to respond in the predetermined sequential order within a predetermined time interval.

2. The method for providing system acknowledge back responses according to claim 1, wherein said selected station is the central station.

3. The method for providing system acknowledge back responses according to claim 2, said method further comprising the steps of:

monitoring the transmitted system acknowledge back response at the central station from the subsequent remote station which previously failed to respond;

repeating, from the central station, the request to acknowledge in response to the subsequent remote station continuing to fail to respond within the predetermined time interval; and transmitting, from the central station, the predetermined station identification number of the subsequent remote station in response to the subsequent remote station failing to respond within a predetermined number of requests to acknowledge.

4. The method for providing system acknowledge back responses according to claim 1, wherein said selected station is the previous remote station in the predetermined sequential order of response.

5. The method for providing system acknowledge back responses according to claim 4, said method further comprising the steps of:

monitoring the transmitted system acknowledge back response at the previous remote station and the central station from the subsequent remote station which previously failed to respond;

transmitting from the previous remote station in the predetermined sequential order the request to acknowledge in response to the subsequent remote station failing to respond within a predetermined period of time; and transmitting from the central station the predetermined station identification number of the subsequent station which fails to respond within a predetermined number of requests to acknowledge.

6. The method for providing system acknowledge back responses according to claim 4, said method further comprising the steps of:

monitoring the transmitted system acknowledge back responses at the previous remote station for the system acknowledge back response from the subsequent remote station in the predetermined sequential order; and transmitting from the next subsequent remote station in the predetermined sequential order the system acknowledge back response in response to the subsequent remote station failing to respond within a predetermined number of requests to acknowledge.

7. A system for providing system acknowledge back responses from a plurality of remote stations to a central station, the system acknowledge back responses including a predetermined station identification number assigned to each remote station and any individual acknowledge back responses received by each remote station from a plurality of portable communication receivers operating in the system, the station identification numbers being assigned to each remote station beginning with a first remote station number and ending with a last remote station number in a predetermined sequential order, said system comprising:

means for generating a start signal and transmitting the same from the central station to initiate the transmission of system acknowledge back responses from the plurality of remote stations;

means for transmitting, from the first remote station, the system acknowledge back response in response to the first station receiving the start signal;

means for transmitting, from each subsequent remote station in the predetermined sequential order, the system acknowledge back response in response to each subsequent remote station receiving the predetermined station identification number of the previous remote station; and means for monitoring the progression of transmitted system acknowledge back responses at a selected station from the remote stations in the predetermined order; and means for generating and transmitting, from the selected station, a request to acknowledge which includes the predetermined station identification number of the previous remote station in response to subsequent remote station failing to respond in the predetermined sequential order within a predetermined time interval.

8. The system for providing system acknowledge back responses according to claim 7 wherein said selected station is the central station.

9. The system for providing system acknowledge back responses according to claim 8, further comprising means for repeating the transmission of the request to acknowledge from the central station, wherein said means for monitoring at the central station monitors the transmitted system acknowledge back response from the subsequent remote station which previously failed to respond;

said means for repeating the transmission from the central station, repeats the transmission of the request for acknowledge in response to the subsequent remote station continuing to fail to respond within the predetermined time interval; and said means for generating and transmitting the request to acknowledge from the central station, further generates and transmits the predetermined station identification number of the subsequent remote station in response to the subsequent remote station failing to respond within a predetermined number of requests to acknowledge.

10. The system for providing system acknowledge back responses according to claim 7, wherein the selected station is the previous remote station in the predetermined sequential order of response.

11. The system for providing system acknowledge back responses according to claim 10, wherein said means for monitoring, monitors the transmitted system acknowledge back response by the previous remote station and the central station from the subsequent remote station which previously failed to respond;

said means for transmitting from a remote station, transmits from the previous remote station in the predetermined sequential order the request to acknowledge in response to the subsequent remote station failing to respond within a predetermined period of time; and said means for generating and transmitting the request to acknowledge from the central station, further generates and transmits the predetermined station identification number of the subsequent station failing to respond within a predetermined number of requests to acknowledge.

12. The method for providing system acknowledge back responses according to claim 10, further comprising:

means for monitoring the transmitted system acknowledge back responses at the previous remote station for the system acknowledge back response from the subsequent remote station in the predetermined sequential order; and means for transmitting from the next subsequent remote station in the predetermined sequential order the system acknowledge back response in response to the subsequent remote station failing to respond within a predetermined number of requests to acknowledge.

13. A remote station, for providing a system acknowledge back response, the remote station operating in a system having a central station and a plurality of remote stations, said remote station comprising:

an acknowledge back receiver, for receiving coded acknowledge back responses from a plurality of portable communication receivers;

means for storing the received coded acknowledge back responses and a predetermined station identification number assigned to each remote station in a predetermined sequential order for identifying the remote station, to provide system acknowledge back response information;

a channel monitor receiver, for receiving a control signal from the central station and the system acknowledge back responses from other remote stations;

a first decoder, responsive to the control signal and system acknowledge back responses to recover the station identification numbers;

a transmitter, coupled to said storing means, for transmitting the stored system acknowledge back response information; and a controller, coupled to said transmitter and to said storing means, for effecting the transmission of the system acknowledge back response information in response to the recovered station identification number corresponding to the previous station identification number of the predetermined sequential order.

14. The remote station according to claim 13, further comprising:

a second decoder, coupled to said acknowledge back receiver, for decoding the coded acknowledge back responses to recover receiver acknowledge back response information;

an encoder, coupled to said second decoder, for encoding the receiver acknowledge back response information into coded acknowledge back responses.

15. The remote station according to claim 14, wherein said second decoder further error corrects the receiver acknowledge back response information.

* * * * *